(12) United States Patent
Balin et al.

(10) Patent No.: US 11,853,417 B2
(45) Date of Patent: Dec. 26, 2023

(54) HARDWARE DEVICE INTEGRITY VALIDATION USING PLATFORM CONFIGURATION VALUES

(71) Applicant: EMC IP Holding Company LLC, Hopkinton, MA (US)

(72) Inventors: Maxim Balin, Gan Yavne (IL); Tomer Shachar, Omer (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/132,001

(22) Filed: Dec. 23, 2020

(65) Prior Publication Data

US 2022/0198004 A1 Jun. 23, 2022

(51) Int. Cl.
*G06F 21/55* (2013.01)
*G06F 21/54* (2013.01)
*G06F 21/60* (2013.01)

(52) U.S. Cl.
CPC .......... *G06F 21/554* (2013.01); *G06F 21/54* (2013.01); *G06F 21/602* (2013.01)

(58) Field of Classification Search
CPC ....... G06F 21/554; G06F 21/54; G06F 21/602
See application file for complete search history.

(56) References Cited

U.S. PATENT DOCUMENTS 5,954,797 A * 9/1999 Sidey .................. H04L 41/00
709/242
11,240,104 B1 * 2/2022 Cieslak ............... H04L 67/303
2003/0009687 A1 * 1/2003 Ferchau ................. G06F 21/64
713/176

(Continued)

OTHER PUBLICATIONS

Peng Zheng • Theophilus A. Benson • Chengchen Hu; Building and Testing Modular Programs for Programmable Data Planes; IEEE Journal on Selected Areas in Communications (vol. 38, Issue: 7, pp. 1432-1447); (Year: 2020).*

(Continued)

*Primary Examiner* — Jahangir Kabir
*Assistant Examiner* — Chao Wang
(74) *Attorney, Agent, or Firm* — Ryan, Mason & Lewis, LLP (57) ABSTRACT

Techniques are provided for hardware device integrity validation using platform configuration values. One method comprises obtaining platform configuration values associated with software of a hardware device; comparing the obtained platform configuration values for the hardware device to one or more platform configuration values stored in a platform configuration table; and performing one or more automated remedial actions (e.g., initiating a reboot of the hardware device) based on a result of the comparison. The platform configuration values for the hardware device may be obtained from a local platform configuration value table of the hardware device. The platform configuration values for the hardware device may be obtained by an integrity validation monitor associated with the hardware device, and the integrity validation monitor may send the obtained platform configuration values for the hardware device to an integrity validation server that securely stores the platform configuration table and performs the comparison.

20 Claims, 8 Drawing Sheets

(56) References Cited

U.S. PATENT DOCUMENTS

2012/0331526 A1* 12/2012 Caudle ............... G06F 21/6209
                                                              726/4
2017/0330449 A1* 11/2017 Lunardhi ............. H04L 67/125
2018/0088929 A1*  3/2018 Eberlein .................. G06F 8/65
2021/0067607 A1*  3/2021 Gardner ............... H04L 41/082
2021/0192038 A1*  6/2021 Shibata ................. G07D 11/40

OTHER PUBLICATIONS

Glas, B. • Klimm, A. • Muller-Glaser, K.D. • Becker, J .; Configuration Measurement for FPGA-based Trusted Platforms; 2009 IEEE/IFIP International Symposium on Rapid System Prototyping (pp. 123-129); (Year: 2009).*

Chun-Hsian Huang • Pao-Ann Hsiung; Model-Based Verification and Estimation Framework for Dynamically Partially Reconfigurable Systems; IEEE Transactions on Industrial Informatics (vol. 7, Issue: 2, pp. 287-301); (Year: 2012).* https://www.windows-security.org/1a41bf0e35003d40c15636c12bfeb11a/configure-tpm-platform-validation-profile-for-bios-based-firmware.

https://tpm2-software.github.io/2020/06/12/Remote-Attestation-With-tpm2-tools.html.

https://openxt.atlassian.net/wiki/spaces/TEST/pages/30408724/TPM+PCRS+Values.

* cited by examiner

HARDWARE DEVICE INTEGRITY VALIDATION USING PLATFORM CONFIGURATION VALUES

FIELD

The field relates generally to information processing systems, and more particularly to the protection of such information processing systems.

BACKGROUND

A trusted platform module (TPM) is a cryptographic processor that secures hardware devices using cryptographic keys. A TPM may employ platform configuration registers (PCRs) that record a software state of a given hardware device. For example, the PCRs may record a platform configuration value (e.g., a hash value) for each kernel-level software component associated with the given hardware device, as well as for the configuration data used by such software components. The PCRs can be read to evaluate the state of the software associated with the given hardware device.

A need exists for improved techniques for protecting hardware devices.

SUMMARY

In one embodiment, a method comprises obtaining one or more platform configuration values for a hardware device, wherein the one or more platform configuration values are associated with software of the hardware device; comparing the obtained platform configuration values for the hardware device to one or more platform configuration values stored in a platform configuration table; and performing one or more automated remedial actions based at least in part on a result of the comparison.

In some embodiments, the platform configuration values for the hardware device are obtained from a local platform configuration value table of the hardware device, that may be secured by a cryptographic module of the hardware device. In one or more embodiments, the platform configuration values for the hardware device are obtained by an integrity validation monitor associated with the hardware device, and the integrity validation monitor sends the obtained platform configuration values for the hardware device to an integrity validation server that securely stores the platform configuration table and performs the comparison.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for hardware device integrity validation using platform configuration values.

In one or more embodiments, the disclosed hardware device protection techniques allow a customer, for example, to have confidence in the integrity of the software associated with a hardware device. The platform configuration values associated with a given hardware device can be validated to determine if any unrecognized software has been added to the hardware device, for example, during a supply chain process or by a malicious actor at a customer location.

In at least some embodiments, verification and integrity validation techniques are provided to protect hardware devices. The evaluation of platform configuration values, discussed further below, for protected hardware devices, allow unauthorized, rouge and/or malicious software changes to the protected hardware device to be identified. In this manner, the platform configuration values can be used to verify and authenticate that no unauthorized and/or malicious software was added to the protected hardware device, such as a storage device. The disclosed techniques for hardware device integrity validation protect a given hardware device, for example, while the protected hardware device is en route to, or installed at, a customer location.

In one or more embodiments, if unauthorized software (e.g., malware) is added to a protected hardware device, the trusted platform module on the protected hardware device creates a platform configuration value (e.g., a hash value) for the new software, and the disclosed techniques for hardware device integrity validation will compare the platform configuration values associated with the protected hardware device against the platform configuration values stored in a global platform configuration hash table and thereby detect any unrecognized platform configuration values.

One or more aspects of the disclosure recognize that one or more platform configuration values in a platform configuration register can be reset or changed by an unauthorized operation (e.g., if an attacker gains a privileged permission on the protected hardware device).

When the PCRs are reset by an attacker, the attacker can reproduce specific PCR values by replaying the hash values.

Hence, the attacker may be able to steal the underlying secret and deceive existing verification processes.

Figure 1:
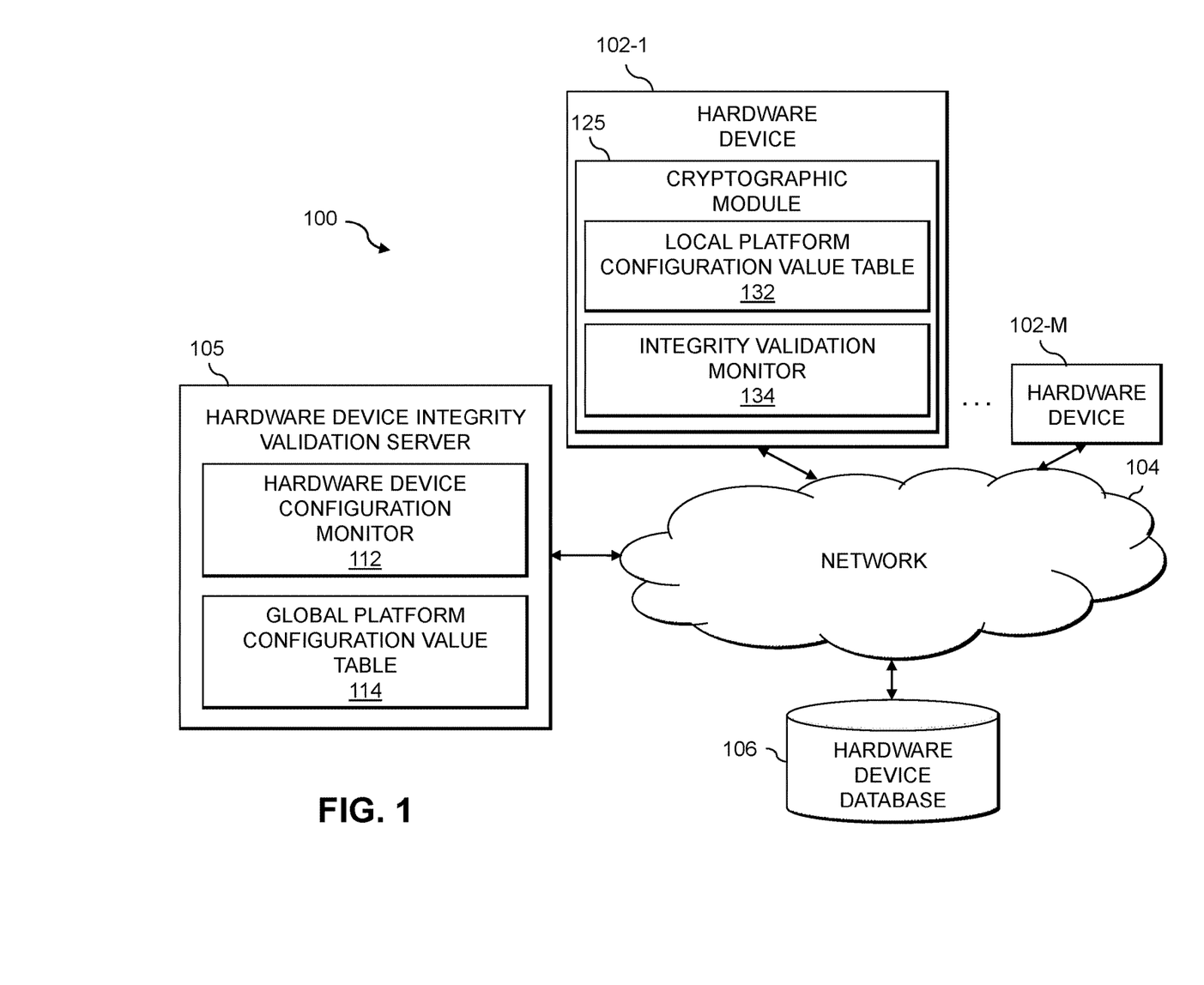
FIG. 1 illustrates an information processing system configured for hardware device integrity validation using platform configuration values in accordance with an illustrative embodiment.

FIG. 1 shows a computer network (also referred to herein as an information processing system) 100 configured in accordance with an illustrative embodiment. The computer network 100 comprises a plurality of hardware devices 102-1 through 102-M, collectively referred to herein as hardware devices 102. The hardware devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is hardware device integrity validation server 105 and hardware device database 106, discussed below.

The hardware devices 102 may comprise, for example, host devices and/or user devices such as mobile telephones, laptop computers, tablet computers, desktop computers or other types of computing devices. Such devices are examples of what are more generally referred to herein as "processing devices." Some of these processing devices are also generally referred to herein as "computers." The hardware devices 102 may comprise a network client that includes networking capabilities such as ethernet, Wi-Fi, etc. When the hardware devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The hardware devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary hardware device 102-1 comprises a cryptographic module 125 that further includes a local platform configuration value table 132 and an integrity validation monitor 134.

It is to be appreciated that this particular arrangement of local platform configuration value table 132 and integrity validation monitor 134 illustrated in the cryptographic module 125 of hardware device 102-1 of the FIG. 1 embodiment is presented by way of example only, and alternative arrangements can be used in other embodiments. For example, the functionality associated with local platform configuration value table 132 and integrity validation monitor 134 in other embodiments can be implementation as a single module or device, or separated across a larger number of modules. As another example, multiple distinct processors can be used to implement different ones of local platform configuration value table 132 or integrity validation monitor 134, or portions thereof.

At least portions of local platform configuration value table 132 and integrity validation monitor 134 may be implemented at least in part in the form of software that is stored in memory and executed by a processor. An exemplary process utilizing local platform configuration value table 132 and integrity validation monitor 134 of an example hardware device 102-1 in computer network 100 will be described in more detail with reference to the flow diagrams of, for example, FIGS. 3, 5 and 6.

In some embodiments, local platform configuration value table 132 and/or integrity validation monitor 134 are implemented in the cryptographic module 125 of the hardware device 102-1. The cryptographic module 125 can be implemented at least in part utilizing a trusted platform module, a tamper-resistant device or another type of trusted hardware of the hardware device 102-1. Such a trusted platform module provides highly secure storage for secret keys and other information of the hardware device 102-1 and in some embodiments comprises or is otherwise associated with a key manager configured to control secure storage of the local platform configuration value table 132 of the hardware device 102-1.

It is to be appreciated that this particular arrangement of hardware device configuration monitor 112 and global platform configuration value table 114 illustrated in the hardware device integrity validation server 105 of the FIG. 1 embodiment is presented by way of example only, and alternative arrangements can be used in other embodiments. For example, the functionality associated with hardware device configuration monitor 112 in other embodiments can be separated across a larger number of modules. As another example, multiple distinct processors can be used to implement different ones of hardware device configuration monitor 112 or portions thereof.

The hardware device integrity validation server 105 may be implemented, for example, on the cloud or on the premises of an enterprise or another entity. In some embodiments, the hardware device integrity validation server 105, or portions thereof, may be implemented as part of a storage system or on a host device. As also depicted in FIG. 1, the hardware device integrity validation server 105 further comprises a hardware device configuration monitor 112 and a global platform configuration value table 114.

It is to be appreciated that this particular arrangement of monitor 112 and table 114 illustrated in the hardware device integrity validation server 105 of the FIG. 1 embodiment is presented by way of example only, and alternative arrangements can be used in other embodiments. For example, the functionality associated with monitor 112 in other embodiments can be separated across a larger number of modules. As another example, multiple distinct processors can be used to implement different ones of monitor 112 or portions thereof.

At least portions of hardware device configuration monitor 112 may be implemented at least in part in the form of software that is stored in memory and executed by a processor. An exemplary process utilizing hardware device configuration monitor 112 of an example hardware device integrity validation server 105 in computer network 100 will be described in more detail with reference to the flow diagrams of, for example, FIGS. 3, 5 and 6.

The hardware device configuration monitor 112 and/or the global platform configuration value table 114, or portions thereof, can be implemented in some embodiments as part of a cybersecurity platform for monitoring hardware devices of a given enterprise, such as the CloudIQ cybersecurity platform from Dell Technologies.

In one or more embodiments, the global platform configuration value table 114 may be unique for a specific hardware device, such as hardware device 102-1, or can be associated with a device type or class of devices (such as a family of products). For example, each hardware device of a particular device type or device class may be expected to have the same software installed. In addition, in at least some embodiments, the global platform configuration value table 114 is stored in a secure storage by the hardware device integrity validation server 105.

Additionally, the hardware device integrity validation server 105 can have an associated hardware device database 106 configured to store, for example, platform configuration values pertaining to one or more exemplary hardware devices that may be protected using the disclosed techniques for hardware device integrity validation and protection. In some embodiments, the global platform configuration value table 114 may be stored in the hardware device database 106.

The hardware device database 106 in the present embodiment is implemented using one or more storage systems associated with the hardware device integrity validation server 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The hardware devices 102 and the hardware device integrity validation server 105 may be implemented on a common processing platform, or on separate processing platforms. The hardware devices 102 (for example, when implemented as host devices) are illustratively configured to write data to and read data to/from the storage system in accordance with applications executing on those host devices for system users.

One or more of the protected hardware devices may comprise storage devices of a storage system. The storage devices illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that numerous different types of storage devices can be protected in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

The hardware devices 102 are configured to interact over the network 104 with the hardware device integrity validation server 105 and/or storage devices. Such interaction illustratively includes generating IO operations, such as write and read requests, and sending such requests over the network 104 for processing by the hardware device integrity validation server 105.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the hardware devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Also associated with the hardware device integrity validation server 105 can be one or more input-output devices (not shown), which illustratively comprise keyboards, displays or other types of input-output devices in any combination. Such input-output devices can be used, for example, to support one or more user interfaces to the hardware device integrity validation server 105, as well as to support communication between the hardware device integrity validation server 105 and other related systems and devices not explicitly shown.

The hardware devices 102 and the hardware device integrity validation server 105 in the FIG. 1 embodiment are assumed to be implemented using at least one processing device. Each such processing device generally comprises at least one processor and an associated memory, and implements one or more functional modules for controlling certain features of the hardware device integrity validation server 105.

More particularly, hardware devices 102 and hardware device integrity validation server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the hardware devices 102 and/or the hardware device integrity validation server 105 to communicate over the network 104 with each other (as well as one or more other networked devices), and illustratively comprises one or more conventional transceivers.

It is to be understood that the particular set of elements shown in FIG. 1 for hardware device integrity validation using platform configuration values is presented by way of illustrative example only, and in other embodiments additional or alternative elements may be used. Thus, another embodiment includes additional or alternative systems, devices and other network entities, as well as different arrangements of modules and other components.

Figure 2:
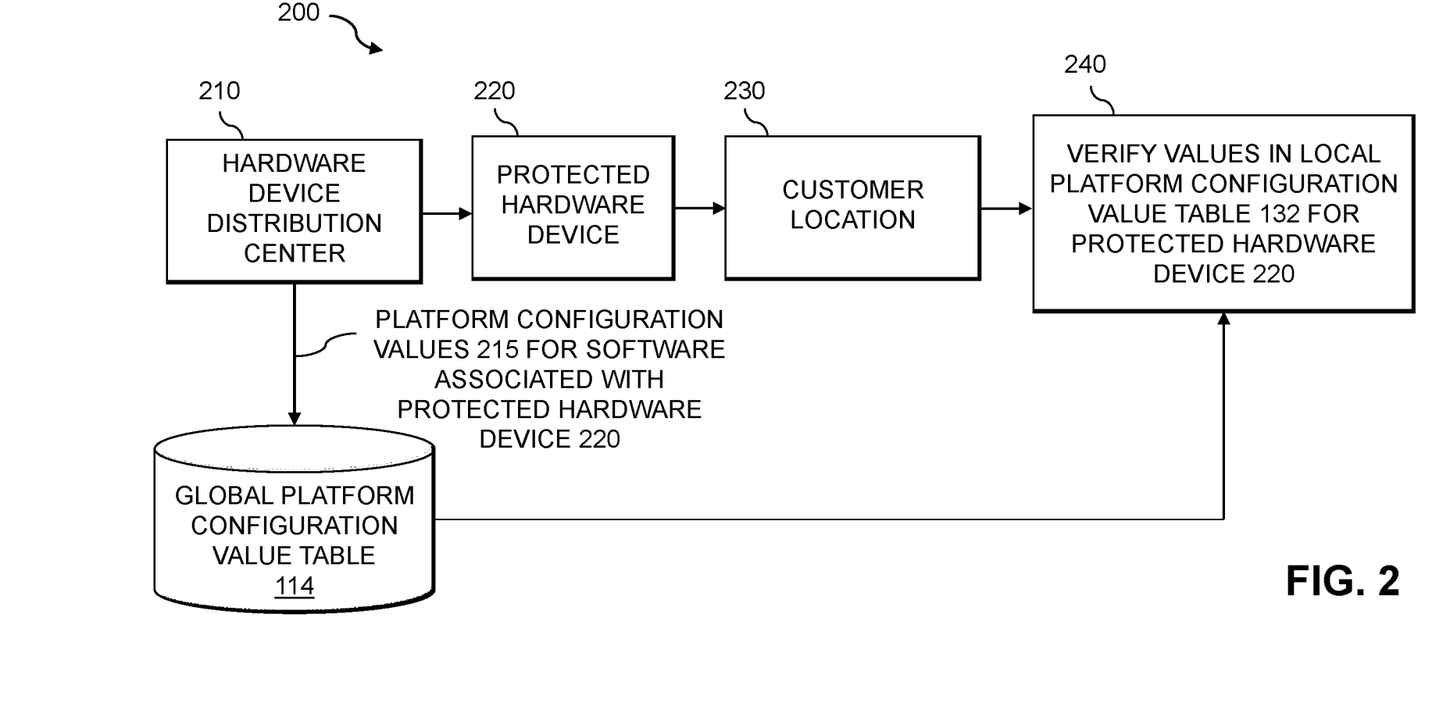
FIG. 2 illustrates a distribution environment for a hardware device, according to an embodiment of the disclosure.

FIG. 2 illustrates a distribution environment 200 for a protected hardware device 220, according to an embodiment of the disclosure. As shown in FIG. 2, an exemplary hardware device distribution center 210 provides the protected hardware device 220 to a customer location, for example, using a supply chain partner, such as a fulfillment and/or shipping partner or another member of the supply chain of the hardware device distribution center 210. The hardware device distribution center 210 may comprise, for example, a fabrication center of a manufacturer, or a storage warehouse for a retailer (e.g., a vendor, seller, or reseller of the protected hardware device 220).

In conjunction with providing the protected hardware device 220 to the customer location 230, for example, the hardware device distribution center 210 also generates the platform configuration values 215 for the software associated with (e.g., installed in and/or otherwise executed by) the protected hardware device 220, in accordance with the disclosed hardware device protection techniques. Generally, the hardware device distribution center 210 can protect the protected hardware device 220 from installation of unauthorized software by generating the platform configuration values 215 for the protected hardware device 220 before surrendering control of the protected hardware device 220, for example, to the customer location 230. In at least some embodiments, the platform configuration values 215 are calculated for an inactive state of the protected hardware device 220.

The generated platform configuration values 215 are stored in the global platform configuration value table 114 of FIG. 1. The platform configuration values 215 may be computed, for example, by applying a hash value to the text of each software element or to an identifier of each software element in (or otherwise associated with) the protected hardware device 220. In some embodiments, only kernel-level software of the protected hardware device 220 may have associated platform configuration values. Techniques for computing platform configuration values for storage in platform configuration registers are well known to persons of ordinary skill in the art.

As shown in FIG. 2, at step 240, the platform configuration values 215 for the protected hardware device 220 are verified, for example, when the protected hardware device 220 is installed, configured and/or activated at the customer location 230, and/or when the protected hardware device 220 attempts to access a service over a network. In at least some embodiments, the platform configuration values 215 for the protected hardware device 220 are verified (e.g., by the hardware device configuration monitor 112 of FIG. 1) by obtaining the platform configuration values 215 from the local platform configuration value table 132 at the time of verification and comparing the obtained platform configuration values 215 with the values previously stored in the global platform configuration value table 114. At the time of verification, the integrity validation monitor 134 can return either: (i) the individual platform configuration values of all software components in the protected hardware device 220, or (ii) an aggregation of the platform configuration values of all software components in the protected hardware device 220 as calculated by the integrity validation monitor 134 at the time of verification.

In this manner, if one or more of the software elements in the protected hardware device 220 is modified, or if an additional software element is inserted into the protected hardware device 220, the platform configuration values 215 will fail the validation and the unauthorized software modification of the protected hardware device 220 will be detected. One or more automated remedial actions can be performed upon detection of an unauthorized software modification of the protected hardware device 220, such as generating a notification to the customer regarding the discovered threat, optionally with one or more suggested solutions, as discussed further below.

Figure 3:
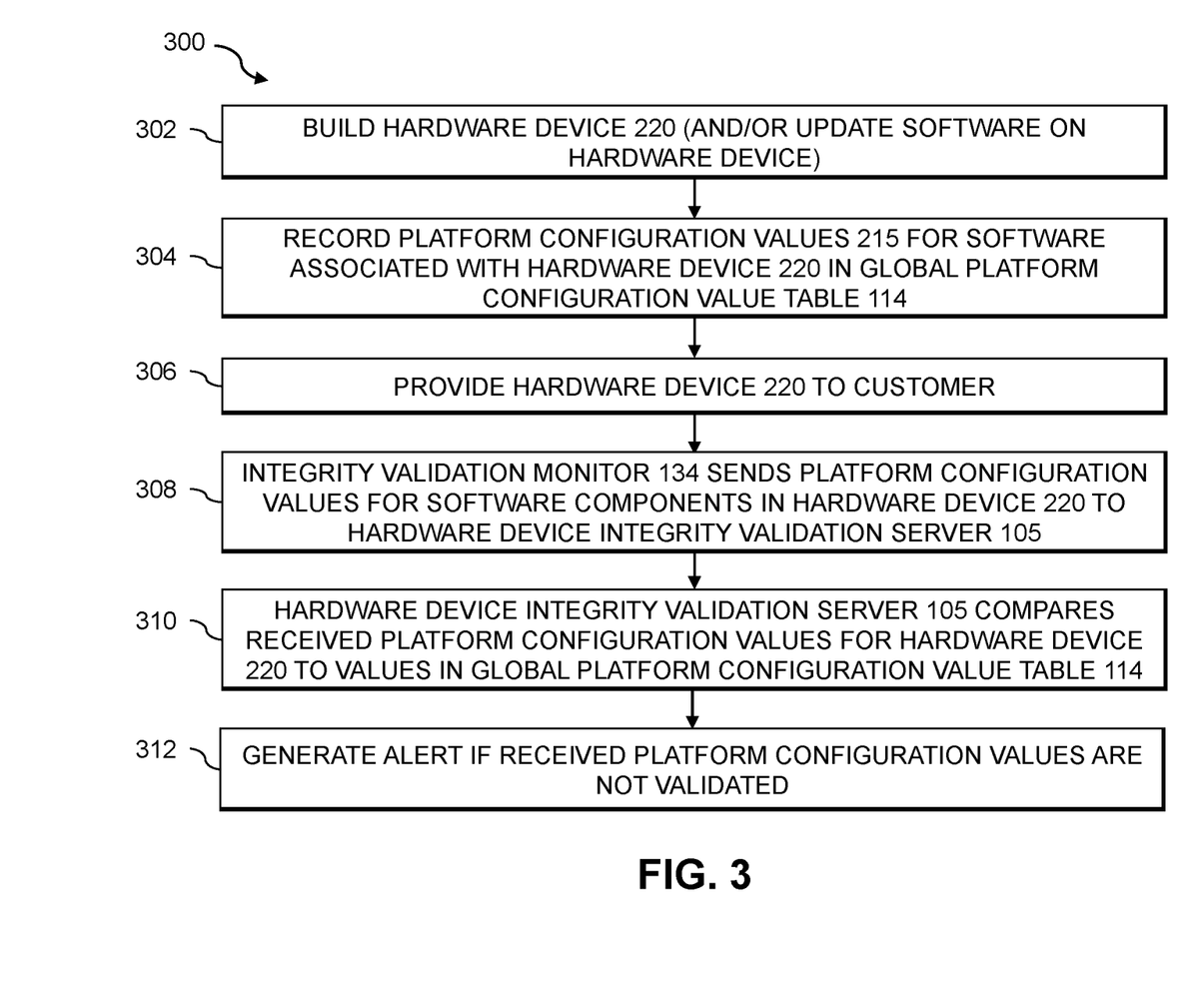
FIG. 3 is a flow diagram illustrating an exemplary implementation of a process for hardware device protection implemented in the distribution environment of FIG. 2, according to an embodiment.

FIG. 3 is a flow diagram illustrating an exemplary implementation of a process 300 for hardware device protection using platform configuration values implemented in the distribution environment 200 of FIG. 2, according to an embodiment. In the example of FIG. 3, the protected hardware device 220 is built and/or updated in step 302. The platform configuration values 215 for the software associated with (e.g., installed in or otherwise executed by) the protected hardware device 220 are recorded in the global platform configuration value table 114 in step 304.

The protected hardware device 220 is then provided to the customer in step 306. The integrity validation monitor 134 sends the platform configuration values for the software components in the protected hardware device 220 in step 308 to the hardware device integrity validation server 105 (e.g., when the protected hardware device 220 is first produced, when software of the protected hardware device 220 is updated and/or when the protected hardware device 220 is rebooted). Likewise, in some embodiments, the platform configuration values for one or more software components removed from the protected hardware device 220 can be removed from the global platform configuration value table 114. The hardware device integrity validation server 105 then compares the received platform configuration values for the protected hardware device 220 to the values previously in the global platform configuration value table 114 in step 310.

Thereafter, an alert is generated in step 312 if the received platform configuration values are not validated in step 310 (e.g., the received platform configuration values are not found in the global platform configuration value table 114).

Figure 4:
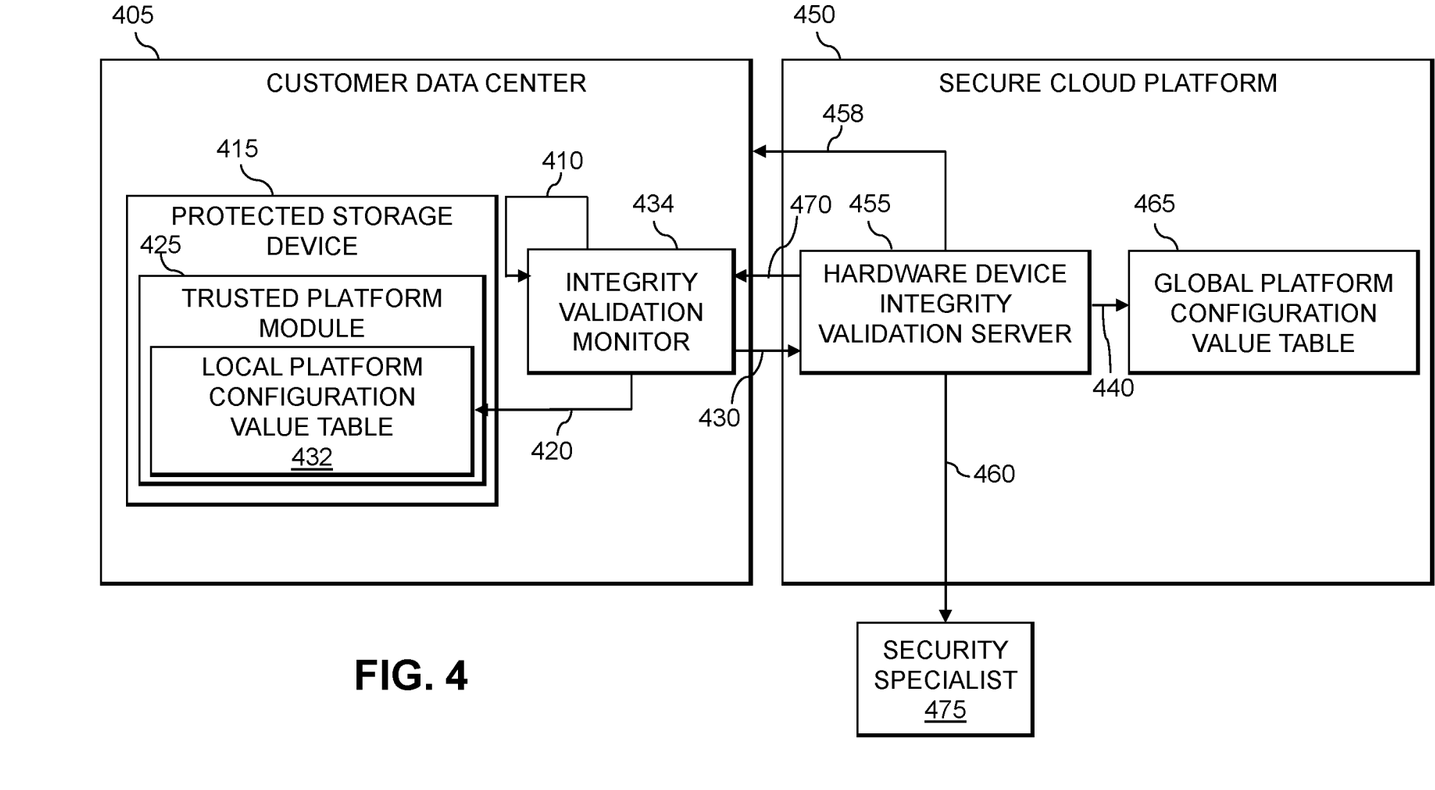
FIG. 4 illustrates an exemplary customer data center and a secure cloud platform configured for hardware device integrity validation using platform configuration values, according to one or more embodiments of the disclosure.

FIG. 4 illustrates an exemplary customer data center 405 and a secure cloud platform 450 configured for hardware device integrity validation using platform configuration values, according to one or more embodiments of the disclosure. In the example of FIG. 4, the exemplary customer data center 405 comprises a protected storage device 415 and an integrity validation monitor 434. The integrity validation monitor 434 may monitor the software integrity of a number of devices in the customer data center 405 using the disclosed techniques. The protected storage device 415 comprises a trusted platform module 425 which further comprises a local platform configuration value table 432.

As shown in FIG. 4, the exemplary secure cloud platform 450 comprises a hardware device integrity validation server 455 and a global platform configuration value table 465. The hardware device integrity validation server 455 may send one or more notifications to a security specialist 475, as discussed further below.

In at least some embodiments, the integrity validation monitor 434 generates a signal 410 that triggers a validation of the protected storage device 415. For example, the integrity validation monitor 434 can send a signal 420 to initiate a collection of the platform configuration values for software associated with the protected storage device 415 from the local platform configuration value table 432. The integrity validation monitor 434 can send the collected platform configuration values to the hardware device integrity validation server 455 using one or more signals 430.

The hardware device configuration monitor 112 (not shown in FIG. 4) of the hardware device integrity validation server 455 may send a signal 440 to check for the received platform configuration values for the protected storage device 415 in the global platform configuration value table 465. In response to the received platform configuration values for the protected storage device 415 not being validated, the hardware device integrity validation server 455 may (i) send a signal 458 to notify the customer data center 405, (ii) send a signal 460 to notify the security specialist 475, and/or (iii) send a signal 470 to notify the integrity validation monitor 434 to initiate a performance of one or more remedial action(s) for the protected storage device 415 (e.g., to reboot the protected storage device 415), as discussed further below.

In one or more embodiments, the secure cloud platform 450 may be an isolated and protected environment that eliminates and/or significantly reduces the influence of an attacker. In this manner, an attacker cannot affect the comparison results. The secure cloud platform 450 may comprise a trusted computing base (TCB) in some embodiments, comprising a collection of software and hardware on a host platform that manages and enforces a security policy of the system. The TCB mechanism may be designed to prevent or reduce the likelihood that the protected storage device 415 will be compromised.

In the example of FIG. 4, the signals 410 through 470 correspond generally to at least portions of the corresponding steps 510 through 570 of FIG. 5, as discussed further below in conjunction with FIG. 5.

Figure 5:
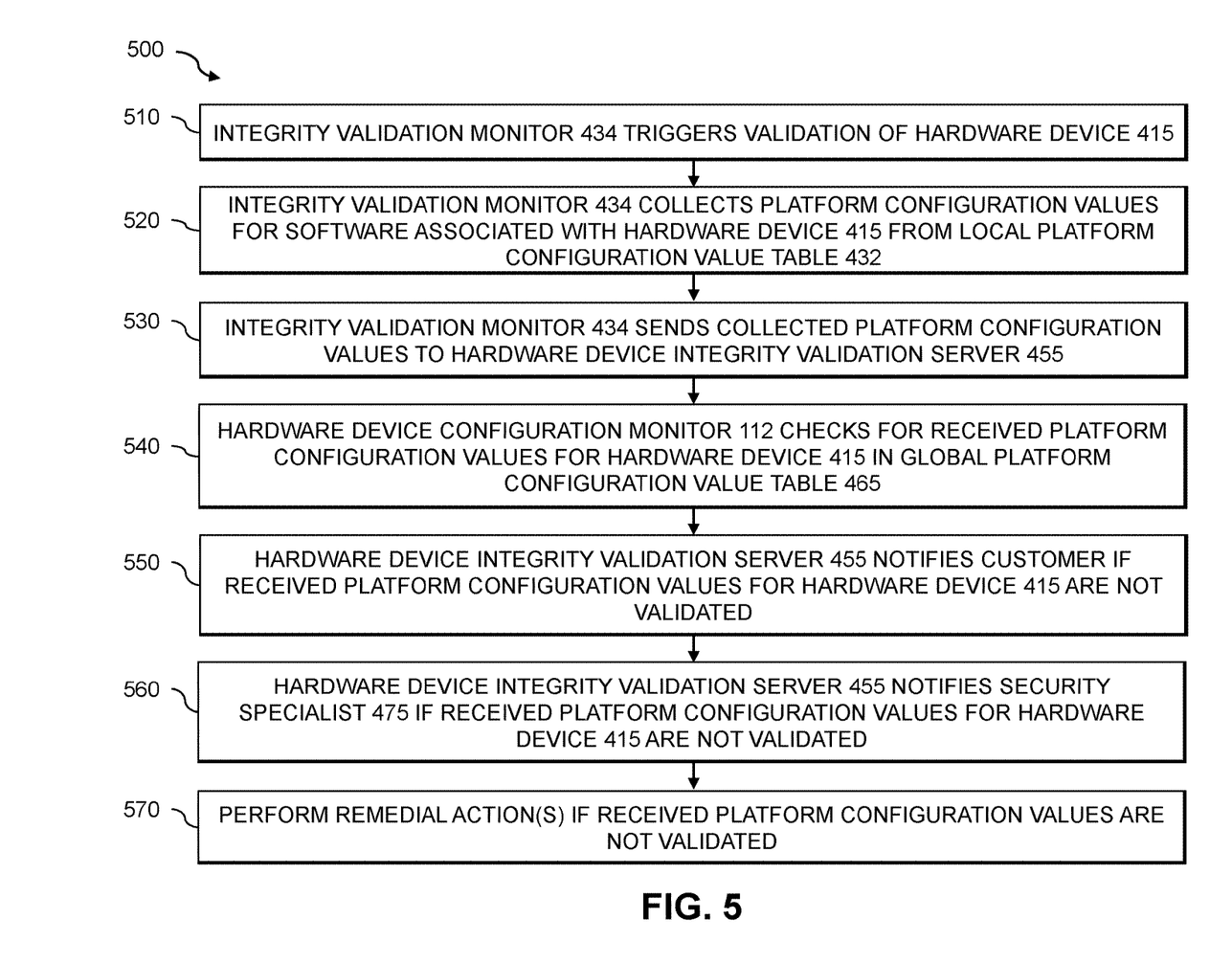
FIG. 5 is a flow diagram illustrating an exemplary implementation of a process for hardware device integrity validation implemented in the customer data center and secure cloud platform of FIG. 4, according to some embodiments.

FIG. 5 is a flow diagram illustrating an exemplary implementation of a process 500 for hardware device integrity validation implemented in the customer data center and secure cloud platform of FIG. 4, according to some embodiments. In the example of FIG. 5, the integrity validation monitor 434 of FIG. 4 triggers a validation of the protected storage device 415 in step 510. In addition, the integrity validation monitor 434 collects platform configuration values for the software associated with the protected storage device 415 in step 520 from the local platform configuration value table 432 of the protected storage device 415. The integrity validation monitor 434 then sends the collected platform configuration values to the hardware device integrity validation server 455 in step 530.

In step 540, the hardware device configuration monitor 112 checks for the received platform configuration values for the protected storage device 415 in the global platform configuration value table 465. The hardware device integrity validation server 455 may notify the customer in step 550 if the received platform configuration values for protected storage device 415 are not validated in the prior step. In addition, the hardware device integrity validation server 455 may notify the security specialist 475 in step 560 if the received platform configuration values for the protected storage device 415 are not validated.

One or more remedial action(s) are performed in step 570 if the received platform configuration values are not validated, as discussed further below.

Figure 6:
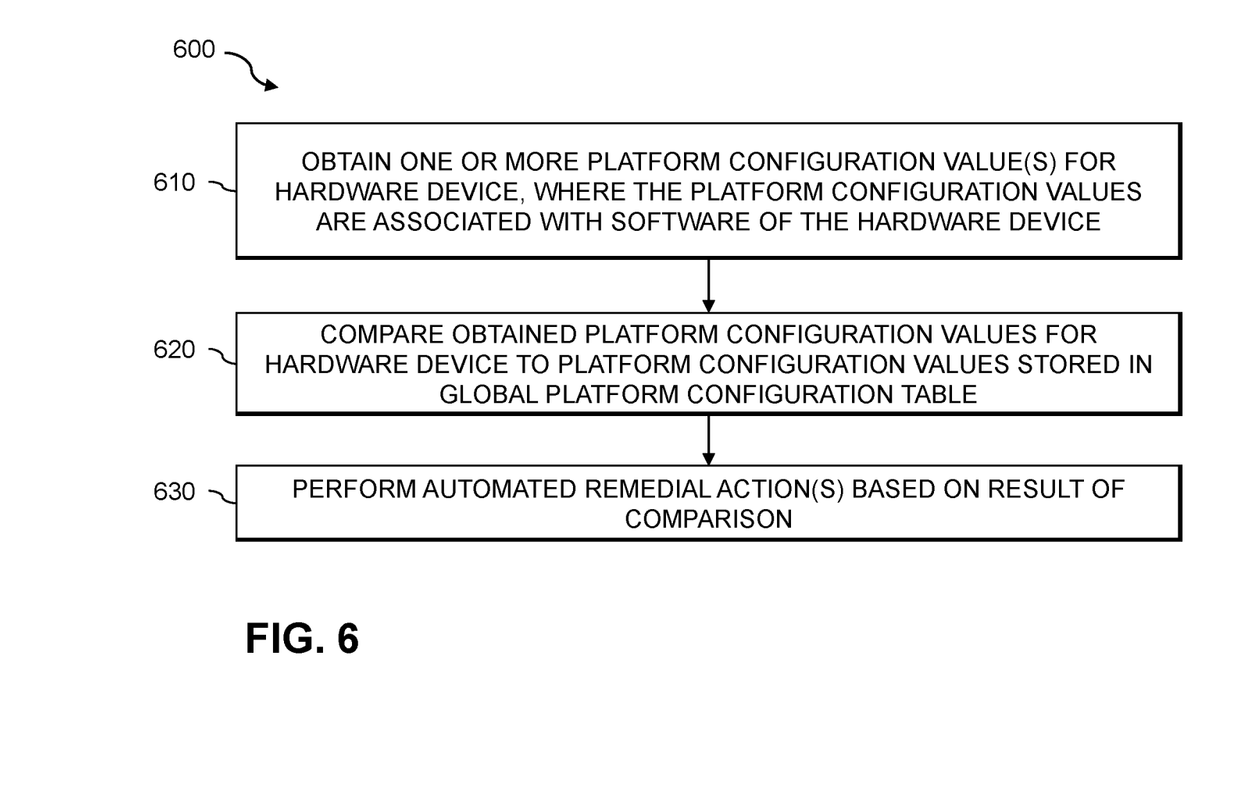
FIG. 6 is a flow diagram illustrating an exemplary implementation of a process for hardware device integrity validation using platform configuration values, according to an illustrative embodiment.

FIG. 6 is a flow diagram illustrating an exemplary implementation of a process 600 for hardware device integrity validation using platform configuration values, according to an illustrative embodiment. In the example of FIG. 6, the process 600 initially obtains one or more platform configuration values for a hardware device in step 610, where the platform configuration values are associated with software of the hardware device. The obtained platform configuration values for the hardware device are compared in step 620 to one or more platform configuration values stored in the global platform configuration value table 114. One or more automated remedial actions are performed in step 630 based on a result of the comparison, as discussed further below.

In some embodiments, the one or more platform configuration values for the hardware device are obtained in step 610 from a local platform configuration value table of the hardware device. The local platform configuration value table of the hardware device may be secured by a cryptographic module (e.g., a trusted platform module) of the hardware device.

In one or more embodiments, the one or more platform configuration values for the hardware device are obtained in step 610 by an integrity validation monitor associated with the hardware device, and the integrity validation monitor sends the obtained platform configuration values for the hardware device to a hardware device integrity validation server 105 that performs the comparison. The hardware device integrity validation server 105 may securely store the global platform configuration table. The comparison may detect an unknown platform configuration value for the hardware device in the global platform configuration table.

As noted above, one or more automated remedial actions are performed in step 630 based on a result of the comparison. For example, if the platform configuration values 215 are not verified in the global platform configuration table, the hardware device integrity validation process of FIG. 6 may detect that one or more unauthorized modifications or additions were made to software of the protected hardware device 220, and may generate an alert notification. The automated remedial actions may comprise (a) initiating a reboot of the hardware device, which will serve to clear the platform configuration value table in memory and remove the threat (e.g., the attacker's manipulations of the platform configuration values and/or the unauthorized software itself) and/or (b) sending one or more notifications (e.g., alerts) (i) to a security specialist that will investigate the unauthorized software modifications or additions, and/or (ii) to a customer associated with the particular hardware device.

As noted above, the platform configuration values may be generated, for example, at a time of manufacture or sale of the protected hardware device 220, or when software is added to the protected hardware device 220, and can be stored in the global platform configuration value table 114.

The particular processing operations and other network functionality described in conjunction with the flow diagrams of FIGS. 3, 5 and 6, for example, are presented by way of illustrative example only, and should not be construed as limiting the scope of the disclosure in any way. Alternative embodiments can use other types of processing operations to validate the integrity software of hardware devices using platform configuration values. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Upon detection of an anomaly with respect to the protected hardware device 220 (e.g., a failure to validate the platform configuration values of the protected hardware device 220), the hardware device integrity validation server 105 can optionally initiate or execute one or more predefined remedial steps and/or mitigation steps to address the detected anomalies. For example, the predefined remedial steps and/or mitigation steps to address the detected anomalies may comprise the transmission of an alert or alarm to the protected hardware device 220 and/or user for important or suspicious events; isolating, removing, quarantining, limiting permissions, analyzing, and deactivating the protected hardware device 220, one or more of the hardware devices 102 and/or one or more files, accounts or aspects of the protected hardware device 220, or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the protected hardware device 220, hardware devices 102, user account, service or machine associated with the detected anomalous activity.

In this manner, when an unauthorized and/or malicious change is detected for the software of a given protected hardware device, the appropriate manufacturer or vendor can be notified to immediately respond to the attack and further security breaches with the protected hardware device can be mitigated. The impacted protected hardware device can optionally be disabled from further operation or otherwise shutdown to prevent the modified protected hardware device 220 from harming the data and/or network environment of the customer.

The disclosed techniques for hardware device integrity validation using platform configuration values can be employed to verify and authenticate that unauthorized and/or malicious changes were not made to the software of a protected hardware device (e.g., while the protected hardware device is in the control of a customer). In this manner, the disclosed techniques for hardware device integrity validation impair the ability of a malicious actor to add or otherwise tamper with the software associated with a protected hardware device.

Among other benefits, the disclosed techniques for hardware device integrity validation using platform configuration values can detect a hostile presence on a vulnerable system when the platform configuration values of a given hardware device are not validated.

One or more embodiments of the disclosure provide improved methods, apparatus and computer program products for hardware device integrity validation using platform configuration values. The foregoing applications and associated embodiments should be considered as illustrative only, and numerous other embodiments can be configured using the techniques disclosed herein, in a wide variety of different applications.

It should also be understood that the disclosed hardware device protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for hardware device integrity validation using platform configuration values may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based hardware device protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based hardware device protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
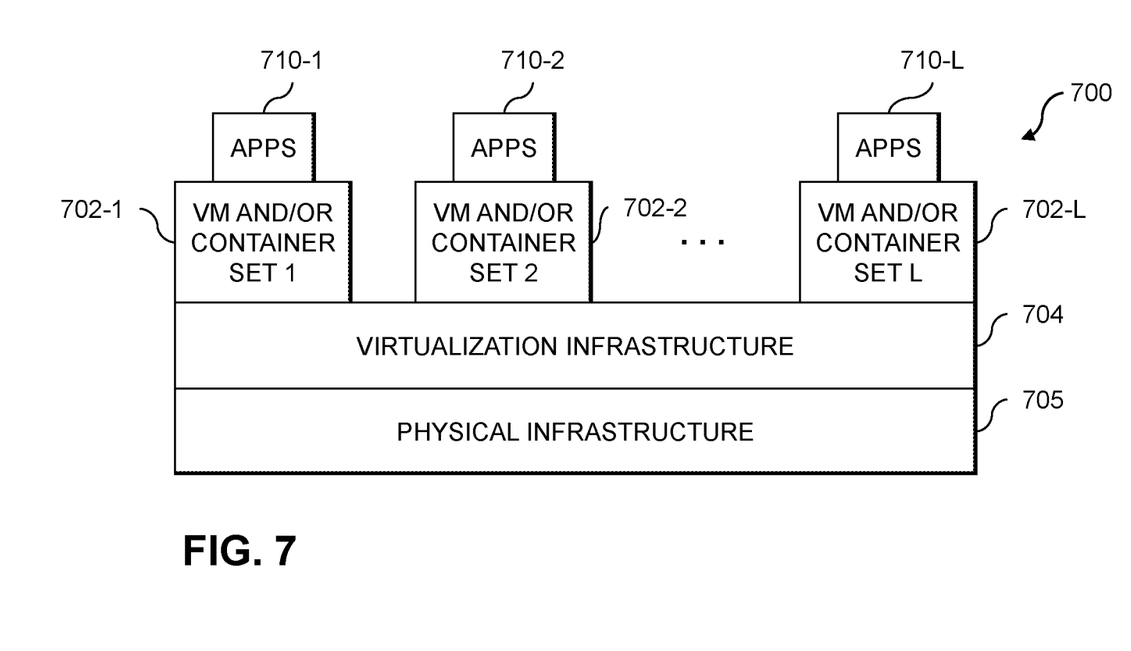
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide hardware device protection functionality of the type described above for one or more processes running on a given one of the VMs. For example, each of the VMs can implement hardware device protection control logic and associated platform configuration value verification functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide hardware device protection functionality of the type described above for one or more processes running on different ones of the containers. For example, a container host device supporting multiple containers of one or more container sets can implement one or more instances of hardware device protection control logic and associated platform configuration value verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
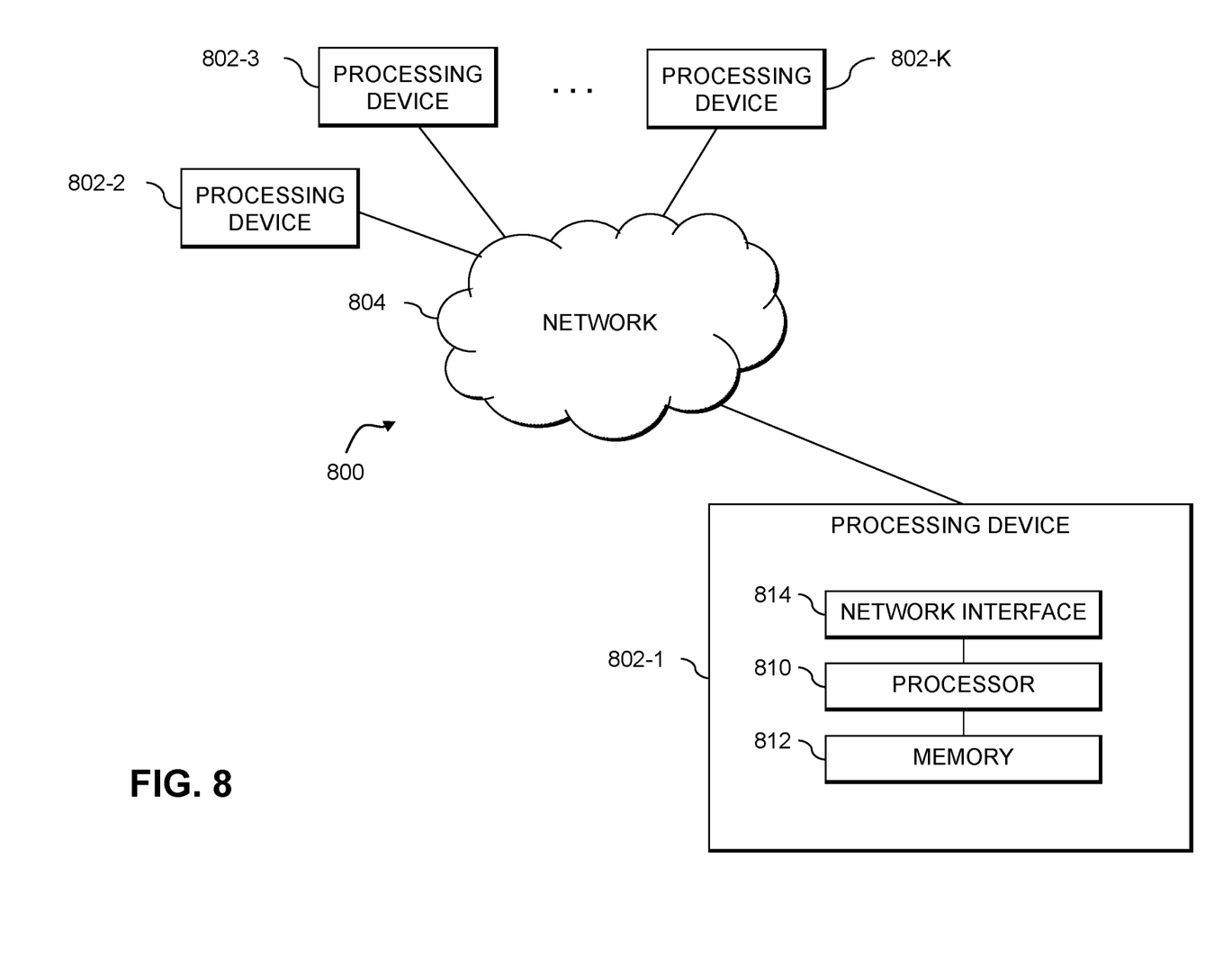
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a plurality of platform configuration values for a hardware device from a local platform configuration value table of the hardware device, wherein the hardware device comprises a plurality of software components, and wherein the platform configuration values are generated by applying a function to one or more of: (i) a content of respective ones of the plurality of software components of the hardware device, and (ii) an identifier of respective ones of the plurality of software components of the hardware device, wherein the function generates the plurality of platform configuration values, and wherein the local platform configuration value table of the hardware device is secured by a cryptographic module of the hardware device;
    comparing the obtained platform configuration values for the hardware device to one or more platform configuration values stored in a second platform configuration table to identify one or more software changes to at least one of the plurality of software components of the hardware device; and
    performing one or more automated actions based at least in part on a result of the comparison, wherein the one or more automated actions comprise one or more of (i) initiating a reboot of the hardware device and (ii) sending one or more notifications to at least one recipient device;
    wherein the method is performed by at least one processing device comprising a processor coupled to a memory.

2. The method of claim 1, wherein the one or more platform configuration values for the hardware device are obtained by an integrity validation monitor associated with the hardware device, and wherein the integrity validation monitor sends the obtained platform configuration values for the hardware device to an integrity validation server that securely stores the second platform configuration table and performs the comparison.

3. The method of claim 1, wherein the one or more platform configuration values for the hardware device are stored in the second platform configuration table in response to the hardware device being produced or in response to at least one software item of the hardware device being updated.

4. The method of claim 1, wherein the comparison detects an unknown platform configuration value for the hardware device in the second platform configuration table.

5. The method of claim 2, wherein the hardware device comprises one of a plurality of hardware devices at a first location that is different than a second location of the integrity validation server.

6. The method of claim 1, wherein the one or more platform configuration values for the hardware device comprise a hash value related to the respective software component.

7. The method of claim 1, wherein the one or more software changes to the at least one of the plurality of software components of the hardware device comprise one or more of: (i) a change to the content of the at least one software component; and (ii) an addition of a new software component to the plurality of software components.

8. An apparatus comprising:
    at least one processing device comprising a processor coupled to a memory;
    the at least one processing device being configured to implement the following steps:
    obtaining a plurality of platform configuration values for a hardware device from a local platform configuration value table of the hardware device, wherein the hardware device comprises a plurality of software components, and wherein the platform configuration values are generated by applying a function to one or more of: (i) a content of respective ones of the plurality of software components of the hardware device, and (ii) an identifier of respective ones of the plurality of software components of the hardware device, wherein the function generates the plurality of platform configuration values, and wherein the local platform configuration value table of the hardware device is secured by a cryptographic module of the hardware device;

comparing the obtained platform configuration values for the hardware device to one or more platform configuration values stored in a second platform configuration table to identify one or more software changes to at least one of the plurality of software components of the hardware device; and performing one or more automated actions based at least in part on a result of the comparison, wherein the one or more automated actions comprise one or more of (i) initiating a reboot of the hardware device and (ii) sending one or more notifications to at least one recipient device.

9. The apparatus of claim 8, wherein the one or more platform configuration values for the hardware device are obtained by an integrity validation monitor associated with the hardware device, and wherein the integrity validation monitor sends the obtained platform configuration values for the hardware device to an integrity validation server that securely stores the second platform configuration table and performs the comparison.

10. The apparatus of claim 8, wherein the one or more platform configuration values for the hardware device are stored in the second platform configuration table in response to the hardware device being produced or in response to at least one software item of the hardware device being updated.

11. The apparatus of claim 8, wherein the comparison detects an unknown platform configuration value for the hardware device in the second platform configuration table.

12. The apparatus of claim 9, wherein the hardware device comprises one of a plurality of hardware devices at a first location that is different than a second location of the integrity validation server.

13. The apparatus of claim 8, wherein the one or more software changes to the at least one of the plurality of software components of the hardware device comprise one or more of: (i) a change to the content of the at least one software component; and (ii) an addition of a new software component to the plurality of software components.

14. A non-transitory processor-readable storage medium having stored therein program code of one or more software programs, wherein the program code when executed by at least one processing device causes the at least one processing device to perform the following steps:

obtaining a plurality of platform configuration values for a hardware device from a local platform configuration value table of the hardware device, wherein the hardware device comprises a plurality of software components, and wherein the platform configuration values are generated by applying a function to one or more of: (i) a content of respective ones of the plurality of software components of the hardware device, and (ii) an identifier of respective ones of the plurality of software components of the hardware device, wherein the function generates the plurality of platform configuration values, and wherein the local platform configuration value table of the hardware device is secured by a cryptographic module of the hardware device;

comparing the obtained platform configuration values for the hardware device to one or more platform configuration values stored in a second platform configuration table to identify one or more software changes to at least one of the plurality of software components of the hardware device; and performing one or more automated actions based at least in part on a result of the comparison, wherein the one or more automated actions comprise one or more of (i) initiating a reboot of the hardware device and (ii) sending one or more notifications to at least one recipient device.

15. The non-transitory processor-readable storage medium of claim 14, wherein the one or more platform configuration values for the hardware device are obtained by an integrity validation monitor associated with the hardware device, and wherein the integrity validation monitor sends the obtained platform configuration values for the hardware device to an integrity validation server that securely stores the second platform configuration table and performs the comparison.

16. The non-transitory processor-readable storage medium of claim 14, wherein the one or more platform configuration values for the hardware device are stored in the second platform configuration table in response to the hardware device being produced or in response to at least one software item of the hardware device being updated.

17. The non-transitory processor-readable storage medium of claim 14, wherein the comparison detects an unknown platform configuration value for the hardware device in the second platform configuration table.

18. The non-transitory processor-readable storage medium of claim 15, wherein the hardware device comprises one of a plurality of hardware devices at a first location that is different than a second location of the integrity validation server.

19. The non-transitory processor-readable storage medium of claim 14, wherein the one or more platform configuration values for the hardware device comprise a hash value related to the respective software component.

20. The non-transitory processor-readable storage medium of claim 14, wherein the one or more software changes to the at least one of the plurality of software components of the hardware device comprise one or more of: (i) a change to the content of the at least one software component; and (ii) an addition of a new software component to the plurality of software components.

* * * * *